United States Patent [19]

Liebl

[11] 4,050,952
[45] Sept. 27, 1977

[54] METHOD OF PRESERVING HONEY

[76] Inventor: David Edmund Liebl, 1136 Drake St., Madison, Wis. 53715

[21] Appl. No.: 743,527

[22] Filed: Nov. 19, 1976

[51] Int. Cl.$^2$ .............................................. A23L 1/08
[52] U.S. Cl. ................................ 127/46 R; 21/54 R; 21/54 A; 127/29; 426/238
[58] Field of Search .................... 127/46 R; 426/238; 21/54 R, 54 A

[56] References Cited

U.S. PATENT DOCUMENTS

| 2,585,103 | 2/1952 | Fitzgerald | 426/238 X |
| 3,212,756 | 10/1965 | Hutton | 426/238 X |
| 3,672,823 | 6/1972 | Boucher | 21/54 R |

OTHER PUBLICATIONS

S. A. Kaloyereas et al., American Bee Journal, 442-443, Nov. 1958.

Primary Examiner—Sidney Marantz

[57] ABSTRACT

A method of preserving honey by inhibiting the crystallization and fermentation of honey with the use of ultrasonic radiation.

1 Claim, No Drawings

METHOD OF PRESERVING HONEY

It is commonly recognised that honey is a perishable food product. It can be rendered unfit for market in many ways, the most common of which are, fermentation and damage due to overheating. Crystallization, although it does not make the honey inedible, is considered unacceptable from a marketing viewpoint. In the past sound waves near 9,000 Hertz have been used to inhibit crystallization. Currently, heating the honey to 160° Fahrenheit is the most popular method of inhibiting crystallization and fermentation of honey. The method of this invention utilizes ultrasonic sound to inhibit the fermentation and crystallization of honey.

Using this method for preserving honey protects the honey from damage due to overheating commonly caused by accepted methods of honey preservation as described above. The honey is exposed to the ultrasonic sound, 18,000–20,000 Hz or higher, at normal processing temperatures, 50°–100° Fahrenheit, for a period of less than five minutes. This eliminates the danger from overheating the honey. Earlier methods using lower frequency sound waves required exposure periods near 30 minutes as well as utilizing sound within the audible range. My method eliminates the disadvantages of using audible sound while significantly reducing the period of exposure.

I claim:

1. A method for (preserving) treating honey which comprises exposing the honey to (ultrasonic sound, 18,000–20,000 Hertz or higher, to inhibit crystallization and fermentation of the honey) ultrasound radiation of at least 18,000 Hertz in a temperature range of 50° to 100° Fahrenheit for less than 5 minutes whereby crystallization and fermentation of the honey are inhibited.

* * * * *

UNITED STATES PATENT AND TRADEMARK OFFICE
CERTIFICATE OF CORRECTION

PATENT NO. : 4,050,952
DATED : September 27, 1977
INVENTOR(S) : David Edmund Liebl It is certified that error appears in the above-identified patent and that said Letters Patent are hereby corrected as shown below:

Column 2, Line 11, delete "(preserving)";

Colum 2, Lines 12-14 delete "(ultrasonic sound, 18,000-20,000 Hertz or higher, to inhibit crystallization and fermentation of the honey)".

Signed and Sealed this

Fourth Day of July 1978

[SEAL]

Attest:

RUTH C. MASON
Attesting Officer

DONALD W. BANNER
Commissioner of Patents and Trademarks